United States Patent
Telang (10) Patent No.: US 8,401,185 B1
(45) Date of Patent: Mar. 19, 2013

(54) SYSTEMS AND METHODS FOR SECURELY DEDUPLICATING DATA OWNED BY MULTIPLE ENTITIES

(75) Inventor: Nilesh Telang, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 470 days.

(21) Appl. No.: 12/697,705

(22) Filed: Feb. 1, 2010

(51) Int. Cl.
*H04L 9/00* (2006.01)

(52) U.S. Cl. .............................. 380/44; 713/193; 726/30

(58) Field of Classification Search .................. 713/153, 713/160, 189, 193; 726/30, 26–27; 380/277, 380/259–262, 44–46; 707/664, 687, 692
See application file for complete search history.

(56) References Cited

U.S. PATENT DOCUMENTS

| | | | | |
|---|---|---|---|---|
| 5,813,008 A * | 9/1998 | Benson et al. ......................... 1/1 |
| 6,370,247 B1 * | 4/2002 | Takaragi et al. ................. 380/28 |
| 6,981,138 B2 * | 12/2005 | Douceur et al. .............. 713/153 |
| 7,043,637 B2 * | 5/2006 | Bolosky et al. ............... 713/171 |
| 7,159,110 B2 * | 1/2007 | Douceur et al. .............. 713/165 |
| 7,266,689 B2 | 9/2007 | Douceur et al. |
| 7,519,635 B1 * | 4/2009 | Haustein et al. ........................ 1/1 |
| 7,840,537 B2 * | 11/2010 | Gokhale et al. .............. 707/652 |
| 7,941,459 B1 * | 5/2011 | Erickson ....................... 707/803 |
| 7,984,026 B2 * | 7/2011 | Iitsuka .......................... 707/692 |
| 8,037,028 B2 * | 10/2011 | Prahlad et al. ............... 707/652 |
| 8,060,715 B2 * | 11/2011 | Cremelie et al. .............. 711/162 |
| 8,117,464 B1 * | 2/2012 | Kogelnik ....................... 713/193 |
| 2002/0034300 A1 * | 3/2002 | Thuvesholmen et al. ...... 380/256 |
| 2004/0221159 A1 * | 11/2004 | Douceur et al. .............. 713/176 |
| 2009/0171888 A1 * | 7/2009 | Anglin ............................... 707/2 |
| 2009/0268903 A1 * | 10/2009 | Bojinov et al. .................. 380/45 |
| 2009/0307490 A1 * | 12/2009 | Dancer ......................... 713/168 |
| 2009/0319772 A1 * | 12/2009 | Singh et al. .................... 713/153 |
| 2010/0082672 A1 * | 4/2010 | Kottomtharayil et al. ..... 707/770 |
| 2010/0198797 A1 * | 8/2010 | Wideman ...................... 707/692 |
| 2010/0241619 A1 * | 9/2010 | Snider et al. .................. 707/693 |
| 2010/0306176 A1 * | 12/2010 | Johnson et al. ............... 707/664 |
| 2010/0318499 A1 * | 12/2010 | Arasu et al. .................... 707/693 |
| 2010/0332454 A1 * | 12/2010 | Prahlad et al. ................ 707/654 |
| 2011/0016095 A1 * | 1/2011 | Anglin et al. ................. 707/692 |
| 2011/0040732 A1 * | 2/2011 | Anglin et al. ................. 707/687 |
| 2011/0196848 A1 * | 8/2011 | Anglin .......................... 707/692 |

OTHER PUBLICATIONS

Enterprise 2.0 Journal; http://security-basics.blogspot.com; Taken from site Nov. 17, 2009.

* cited by examiner

*Primary Examiner* — April Shan
*Assistant Examiner* — Eric W Shepperd
(74) *Attorney, Agent, or Firm* — Advantedge Law Group (57) ABSTRACT

A computer-implemented method for securely deduplicating data owned by multiple entities may include identifying a plurality of data segments to store on a third-party storage system and, for each data segment: 1) identifying a hash of the data segment, 2) transmitting the hash of the data segment to a central server, 3) receiving an encrypted string that is based on the hash of the data segment from the central server, 4) encrypting the data segment with the encrypted string, and 5) transferring the encrypted data segment to the third-party storage system. Various other methods, systems, and computer-readable media are also disclosed.

18 Claims, 8 Drawing Sheets

SYSTEMS AND METHODS FOR SECURELY DEDUPLICATING DATA OWNED BY MULTIPLE ENTITIES

BACKGROUND

Organizations and consumers increasingly use third-party services to store data. Third-party storage services may provide a number of benefits to customers, including flexibility, low capitalization requirements, off-site backups, and centralized access to data.

In order to maximize the efficiency of their storage systems, third-party storage vendors may attempt to deduplicate the data received from their customers. For example, if two customers each wish to store a copy of the same block of data, a third-party storage vendor may, instead of storing two copies of the data, store a single copy of the data and reference the copy twice.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical blocks of data using different encryption schemes (e.g., different keys), the resulting encrypted blocks of data will differ, potentially preventing the third-party storage vendor from deduplicating the two blocks of data into a single block that is referenced twice.

In some cases, a third-party storage vendor may require that its customers use convergent encryption techniques (also known as content hash keying) when encrypting data in order to allow the storage vendor to subsequently deduplicate the encrypted data. In convergent encryption, an encryption key for encrypting a block of data may be derived from the block of data itself, such that identical blocks of data may result in identical encrypted blocks of data. Unfortunately, convergent encryption techniques may expose encrypted data to certain brute-force attacks, such as learn-partial-information attacks. For example, if a customer encrypts (using convergent encryption) a document that contains both publicly available information (such as a government form) and sensitive data (such as a Social Security number populated in the government form), then the attacker may progressively populate and convergently encrypt the publicly available government form with each possible Social Security number combination until the encrypted version of the document created by the attacker matches the version encrypted by the customer, thus revealing the customer's Social Security number.

In view of the above limitations, the instant disclosure identifies a need for securely encrypting and deduplicating data owned by multiple entities.

SUMMARY

As will be described in greater detail below, the instant disclosure generally relates to systems and methods for securely deduplicating data owned by multiple entities by using a central server to provide an encrypted string (based on a hash of a data segment to be encrypted and stored on a third-party storage system) for use as a key for encrypting the data segment. In one example, one or more of the various systems described herein may accomplish this task by identifying a plurality of data segments to back up to a third-party storage system and then, for each data segment: 1) identifying a hash of the data segment, 2) transmitting the hash of the data segment to a central server, 3) receiving an encrypted string that is based on the hash of the data segment from the central server, 4) encrypting the data segment with the encrypted string, and then 5) transferring the encrypted data segment to the third-party storage system.

In some examples, the third-party storage system may represent a single-instance storage system. In addition, the encrypted string may include an encryption of the hash of the data segment that was encrypted using a key that is based on the hash of the data segment. In some examples, the encrypted string may represent a symmetric key for encrypting the data segment.

In some embodiments, one or more of the systems described herein may access the data segment from the third-party storage system. For example, when storing the data segment on the third-party storage system, one or more of the various systems described herein may: 1) identify a hash of the encrypted data segment and then 2) save a hash-string pair that includes the hash of the encrypted data segment and the encrypted string. Later, to access the data segment from the third-party storage system, one or more of the various systems described herein may: 1) retrieve the encrypted data segment from the third-party storage system, 2) identify the hash of the encrypted data segment, 3) locate the hash-string pair using the hash of the encrypted data segment, 4) identify the encrypted string in the hash-string pair, and then 5) decrypt the encrypted data segment with the encrypted string.

In some examples, the systems described herein may identify a policy that restricts cross-client convergent encryption for the data segment. The policy may include, for example, a limitation of the percentage of data segments in the plurality of data segments that may be encrypted using cross-client convergent encryption. Additionally or alternatively, the policy may include an indicator that the data segment is too sensitive to undergo cross-client convergent encryption. Under such policies, the encrypted string may include an encryption of the hash of the data segment that was encrypted using a client-specific key.

As will be described in greater detail below, by using a central server to provide encrypted strings (e.g., encrypted hashes of the data segments that are to be encrypted) for use as keys for encrypting the data segments, the various systems and methods described herein may enable third-party storage vendors to deduplicate data owned by multiple entities without exposing such deduplicated data to information attacks, such as learn-partial-information attacks.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for securely deduplicating data owned by multiple entities. The following will provide, with reference to FIGS. 1-3, detailed descriptions of exemplary systems for securely deduplicating data owned by multiple entities. Detailed descriptions of corresponding computer-implemented methods will also be provided in connection with FIGS. 4-6. In addition, detailed descriptions of an exemplary computing system and network architecture capable of implementing one or more of the embodiments described herein will be provided in connection with FIGS. 7 and 8, respectively.

Figure 1:
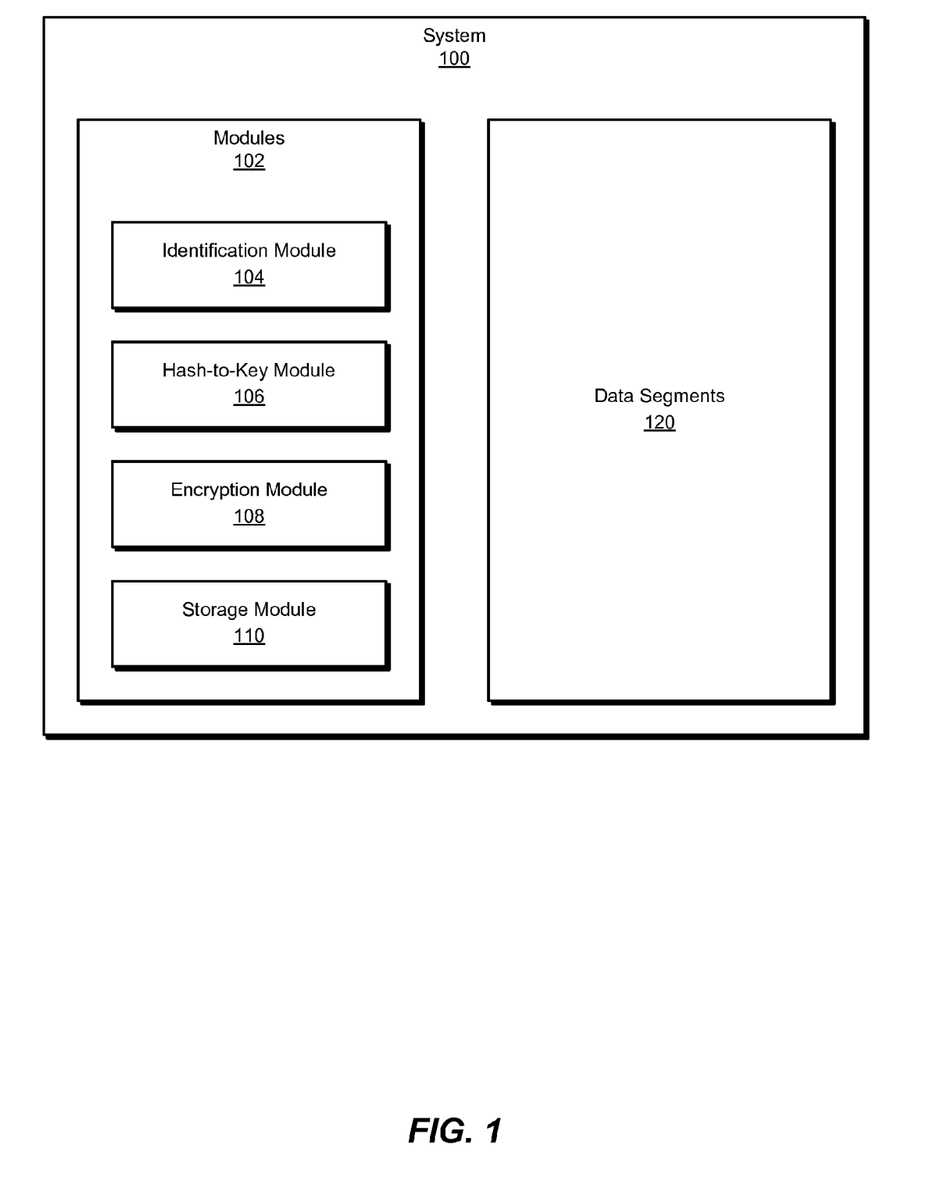
FIG. 1 is a block diagram of an exemplary system for securely deduplicating data owned by multiple entities.

FIG. 1 is a block diagram of an exemplary system 100 for securely deduplicating data owned by multiple entities. As illustrated in this figure, exemplary system 100 may include one or more modules 102 for performing one or more tasks. For example, and as will be explained in greater detail below, exemplary system 100 may include an identification module 104 programmed to identify a plurality of data segments to store on a third-party storage system. Exemplary system 100 may also include a hash-to-key module 106 programmed to, for each data segment: 1) identify a hash of the data segment, 2) transmit the hash of the data segment to a central server, and then 3) receive an encrypted string that is based on the hash of the data segment from the central server. Exemplary system 100 may further include an encryption module 108 programmed to encrypt the data segment with the encrypted string.

In addition, and as will be described in greater detail below, exemplary system 100 may include a storage module 110 programmed to transfer the encrypted data segment to the third-party storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIGS. 2 and 3 (e.g., client 202 and/or key server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a plurality of data segments 120. Data segments 120 may represent portions of a single file system or storage device or a plurality of file systems or storage devices. For example, data segments 120 may represent a portion of data stored on client 202 and/or clients 302(1)-(N) in FIGS. 2 and 3, computing system 710 in FIG. 7, and/or portions of exemplary network architecture 800 in FIG.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2 and/or exemplary system 300 illustrated in FIG. 3. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 2:
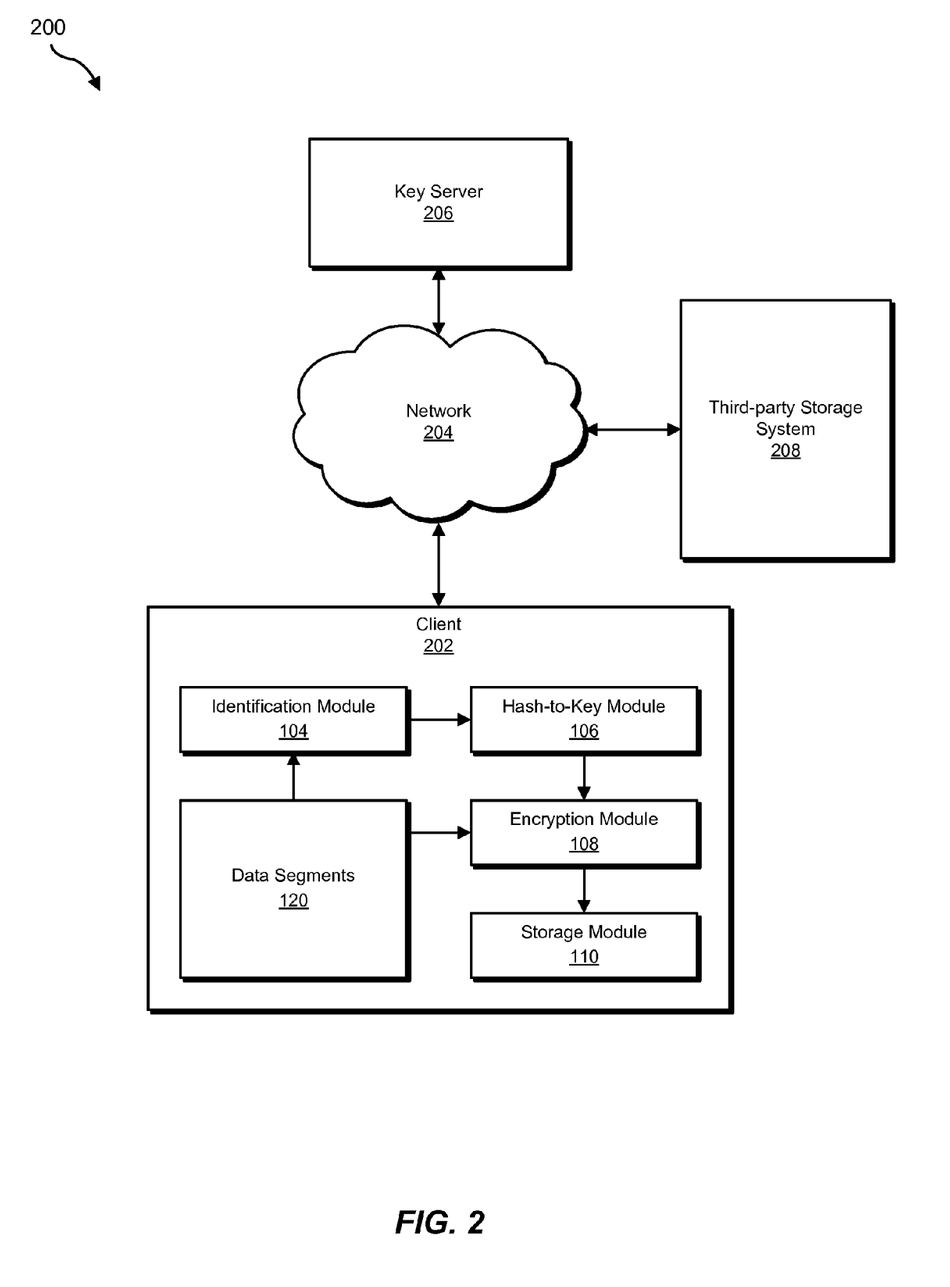
FIG. 2 is a block diagram of an exemplary system for securely deduplicating data owned by multiple entities.

As shown in FIG. 2, system 200 may include a client 202 in communication with a key server 206 and a third-party storage system 208 via a network 204. In one embodiment, and as will be described in greater detail below, modules 102 from FIG. 1 may cause client 202 to identify a plurality of data segments (such as data segments 120) to store on a third-party storage system (such as third-party storage system 208) and, for each data segment: 1) identify a hash of the data segment (by, e.g., hashing the data segment), 2) transmit the hash of the data segment to a central server (such as key server 206), 3) receive an encrypted string that is based on the hash of the data segment from the central server, 4) encrypt the data segment with the encrypted string, and then 5) transfer the encrypted data segment to the third-party storage system.

Client 202 generally represents any type or form of computing device capable of reading computer-executable instructions. Examples of client 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Key server 206 generally represents any type or form of computing device that is capable of encrypting a data string and/or generating an encryption key. Examples of key server 206 include, without limitation, application servers and database servers configured to provide various database services and/or run certain software applications. Key server 206 may also represent a collection and/or distributed network of servers.

Third-party storage system 208 generally represents any type or form of computing system that is capable of storing and deduplicating data. Examples of third-party storage system 208 include, without limitation, application servers and database servers configured to provide various database services and/or run certain software applications, storage appliances, and/or networks of servers and/or storage appliances.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between client 202 and key server 206, as well as communication between client 202 and third-party storage system 208.

Figure 3:
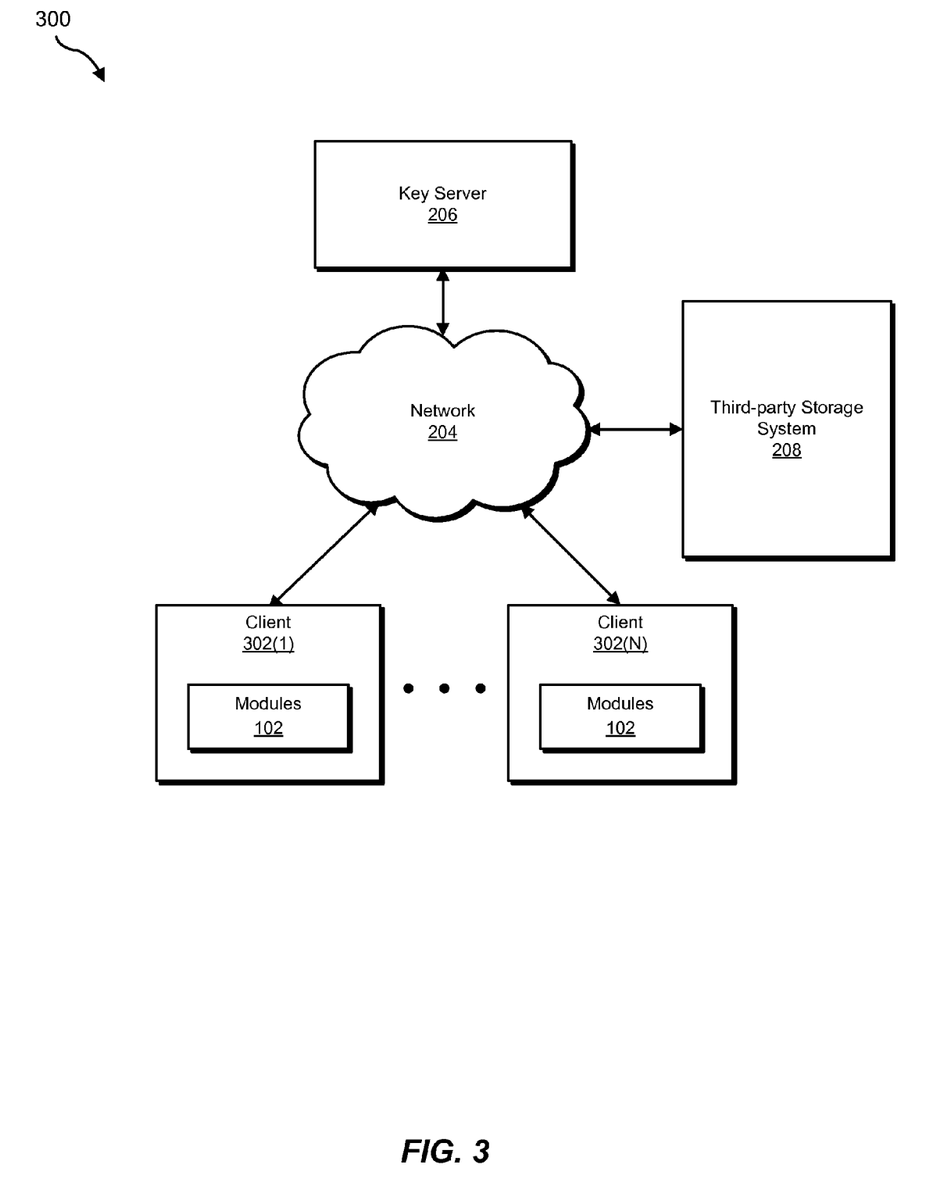
FIG. 3 is a block diagram of an exemplary system for securely deduplicating data owned by multiple entities.

In some examples, multiple clients may be configured to use the same central server (e.g., key server 206). For example, as illustrated in FIG. 3, an exemplary system 300 for securely deduplicating data owned by multiple entities may include a plurality of clients 302(1)-(N), each of which may be configured with modules 102.

Figure 4:
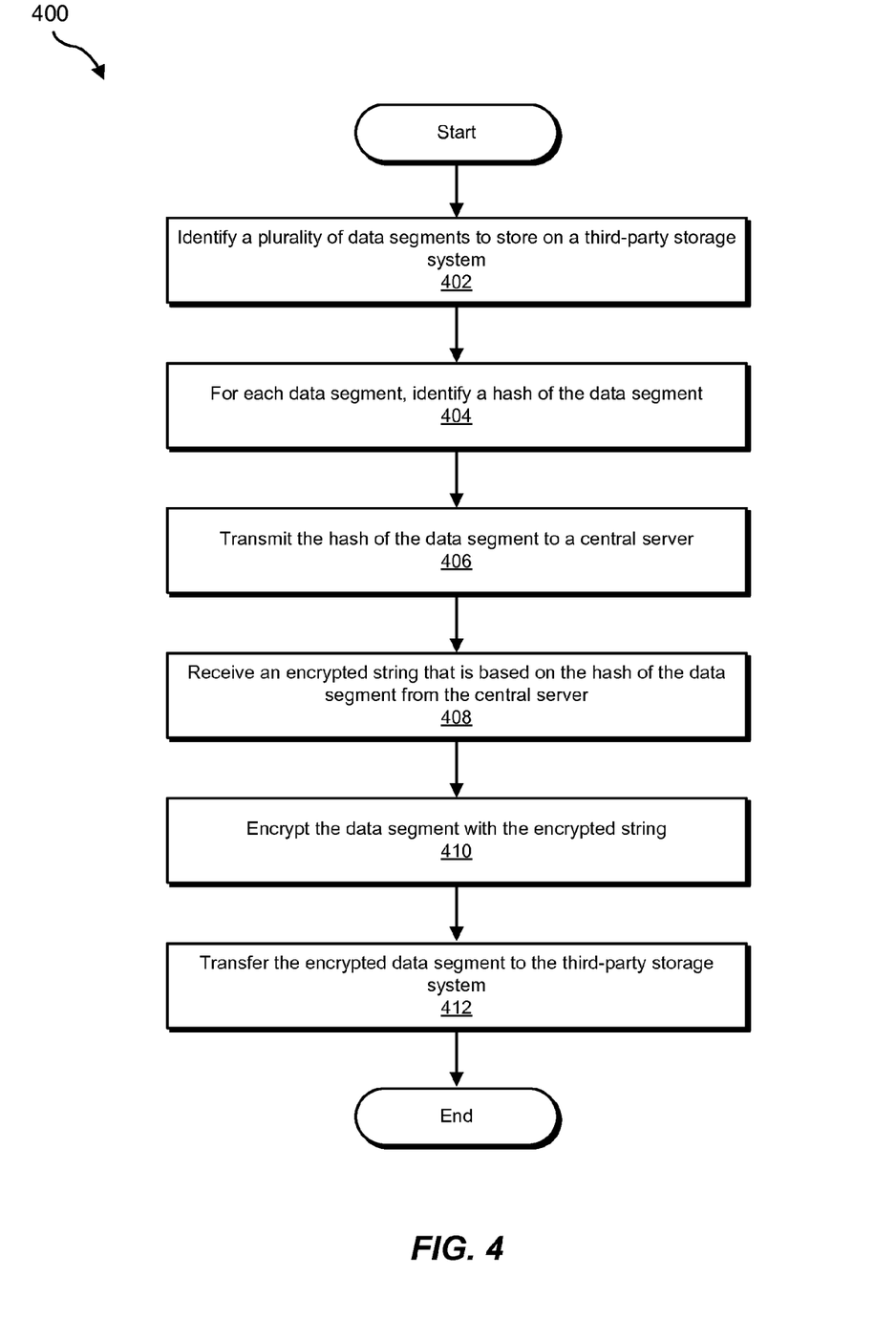
FIG. 4 is a flow diagram of an exemplary method for securely deduplicating data owned by multiple entities.
Figure 5:
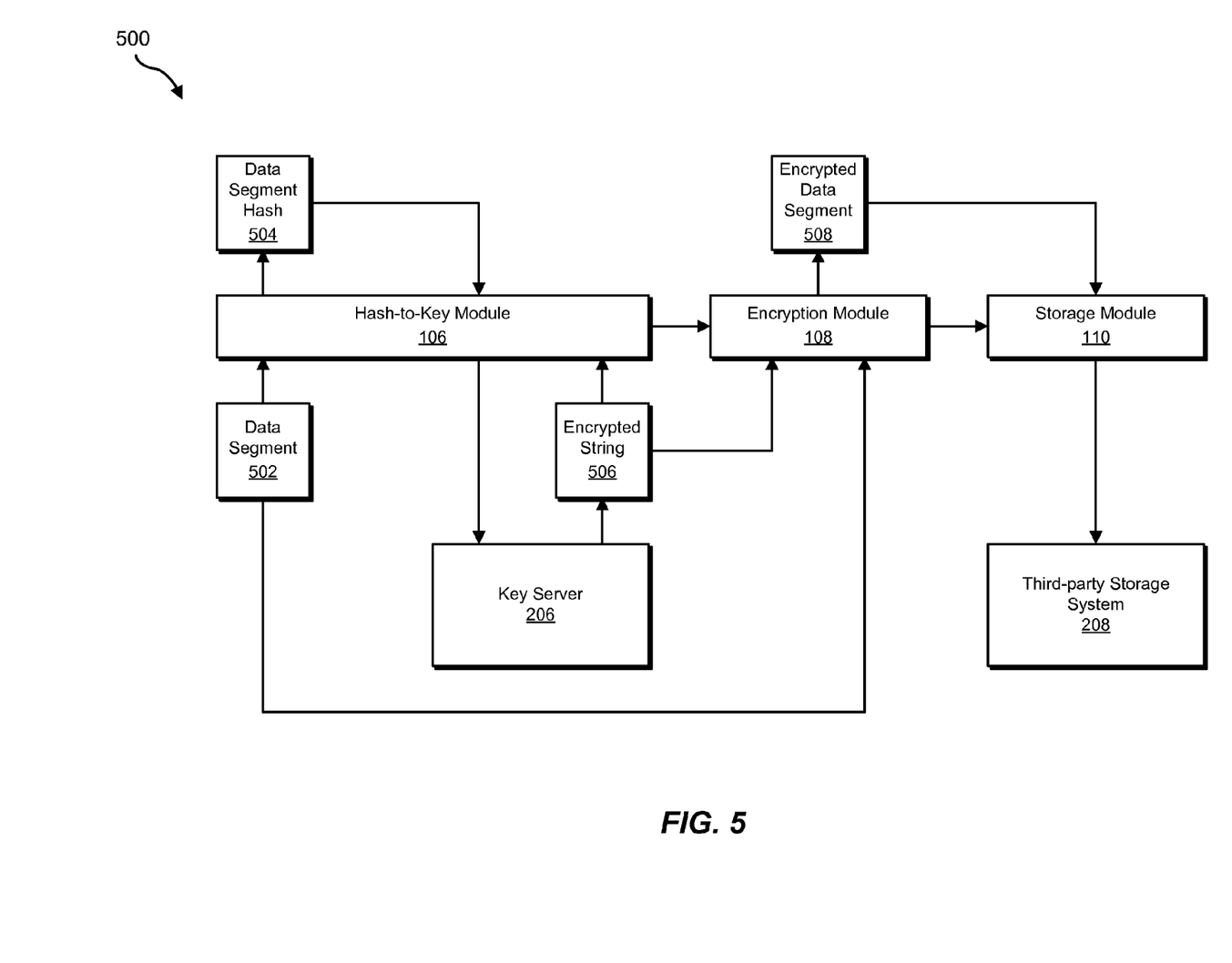
FIG. 5 is a block diagram of an exemplary system for securely deduplicating data owned by multiple entities.

FIG. 4 is a flow diagram of an exemplary computer-implemented method 400 for securely deduplicating data owned by multiple entities. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, and/or system 300 in FIG. 3.

As illustrated in FIG. 4, at step 402 one or more of the systems described herein may identify a plurality of data segments to store on a third-party storage system. For example, at step 402 identification module 104 may, as part of client 202, identify data segments 120 to store on third-party storage system 208.

As used herein, the term "data segment" may refer to any unit of data. Examples of a data segment include, but are not limited to, a file, a portion of a file, a data block, and/or a database entry. Additionally, as used herein the term "third-party storage system" may refer to any type or form of storage system, including cloud-based storage systems, that is capable of storing and deduplicating data. In some examples, the third-party storage system may include a single-instance storage system (i.e., a storage system configured to only store a single instance of content for multiple owners).

Identification module 104 may identify data segments in step 402 in a variety of ways. In one example, identification module 104 may retrieve information from a configuration file that identifies the plurality of data segments. Additionally or alternatively, identification module 104 may receive a message that identifies the plurality of data segments.

In some embodiments, identification module 104 may identify one or more files to be stored on the third-party storage device and then divide the files into a plurality of data segments, thereby identifying the plurality of data segments. For example, identification module 104 may divide a plurality of files into data segments of a pre-configured segment size. In some examples, identification module 104 may insert a segment break before reaching the pre-configured segment size. For example, when backing up files along with security credentials for accessing the files (using, e.g., an API such as BackupRead for MICROSOFT WINDOWS), identification module 104 may insert a segment break at the end of the file-contents section and security credentials section of the data stream so that both sections will be stored in different data segments, enabling deduplication to be achieved on both types of data.

Identification module 104 may perform step 402 in a variety of contexts. For example, identification module 104 may identify a plurality of data segments to store on a third-party storage system in order to move files represented by the plurality of data segments to the third-party storage system. Additionally or alternatively, identification module 104 may identify the plurality of data segments to back up the plurality of data segments to the third-party storage system.

Returning to FIG. 4, at step 404 one or more of the systems described herein may identify, for each data segment, a hash of the data segment. For example, at step 404 hash-to-key module 106 may, as part of client 202, identify a hash for each data segment within data segments 120. As used herein, the term "hash" may refer to any type of fingerprint, hash function output, checksum, and/or digital signature that corresponds to a data segment.

Hash-to-key module 106 may perform step 404 in any suitable manner. In one example, hash-to-key module 106 may identify a hash of the data segment by hashing the data segment. For example, hash-to-key module 106 may perform a hash function with the data segment as input and identify the hash of the data segment as output. In some examples, hash-to-key module 106 may be configured to perform a particular hash function on the data segment so that all instances of hash-to-key module 106 may produce the same hash given the same data segment. For example, using FIG. 3 as an example, client 302(1) and client 302(N) may have a data segment in common (such as a data segment from a pair of identical files) to store on third-party storage system 208. In this example, hash-to-key module 106 on client 302(1) may use the same hash function to identify the hash as hash-to-key module 106 on client 302(N).

Returning to FIG. 4, at step 406 one or more of the systems described herein may transmit the hash of the data segment to a central server. For example, hash-to-key module 106 may, as part of client 202 in FIG. 2, transmit a hash of a data segment (such as a data segment hash 504 of a data segment 502 in FIG. 5) to key server 206.

As used herein, the term "central server" may refer to any computing system that is capable of encrypting a data string and/or generating an encryption key. In some examples, the central server may perform a similar function for more than one client. For example, and as illustrated in FIG. 3, each of clients 302(1)-(N) may be configured with hash-to-key module 106 to use key server 206. In some examples, the central server may be controlled, managed, and/or owned by an organization independent from the organization that controls, manages, and/or owns the third-party storage system.

Hash-to-key module 106 may perform step 406 in any suitable manner. For example, hash-to-key module 106 may transmit the hash of the data segment to the central server as part of a request for a key with which to encrypt the data segment. As will be explained in greater detail below, hash-to-key module 106 may also later receive a key for encrypting the data segment.

Returning to FIG. 4, at step 408 one or more of the systems described herein may receive an encrypted string that is based on the hash of the data segment from the central server. For example, at step 408 hash-to-key module 106 may, as part of client 202 in FIG. 2, receive an encrypted string that is based on the hash of the data segment (such as an encrypted string 506 that is based on data segment hash 504 in FIG. 5) from key server 206.

Hash-to-key module 106 may perform step 408 in any suitable manner. For example, hash-to-key module 106 may receive the encrypted string as part of an isolated session in which hash-to-key module 106 previously transmitted the hash of the data segment to the central server. Additionally or alternatively, hash-to-key module 106 may receive the encrypted string along with other encrypted strings corresponding to other data segment hashes processed by the central server for hash-to-key module 106.

In some examples, the encrypted string may include an encryption of the hash of the data segment using a key that is based on the hash of the data segment. For example, the central server may map the hash of the data segment to a key value (by, e.g., using another hash function, a transformation function, and/or a mapping function) and then encrypt the hash of the data segment using that key value. In some embodiments, the central server may always use the same function to generate the key for a given data segment hash. For example, key server 206 may use the same function to generate keys from hashes for each of clients 302(1)-(N) in FIG. 3. In this way, if any two of clients 302(1)-(N) submit the same hash to key server 206, then these clients may receive the same encrypted string from key server 206.

Returning to FIG. 4, at step 410 one or more of the systems described herein may encrypt the data segment with the encrypted string. For example, at step 410 encryption module 108 may, as part of client 202 in FIG. 2, encrypt the data segment (e.g., data segment 502 in FIG. 5) with the encrypted string (e.g., encrypted data segment 508 in FIG. 5).

Encryption module 108 may perform step 410 in any suitable manner. In one example, encryption module 108 may use the encrypted string as a key in a cryptographic algorithm to encrypt the data segment. In this example, encryption module 108 may use any of a variety of cryptographic algorithms, including but not limited to advanced encryption standard (AES), Blowfish, data encryption standard (DES) (including Triple DES), Serpent, Twofish, etc. In some examples, encryption module 108 may use a use a symmetric-key algorithm and may use the encrypted string as a symmetric key. In these examples, and as will be explained in greater detail below, the encrypted string (i.e., as a symmetric key) or a variant of the encrypted string may be later used to decrypt the data segment.

Returning to FIG. 4, at step 412 one or more of the systems described herein may transfer the encrypted data segment to the third-party storage system. For example, at step 412 storage module 110 may, as part of client 202 in FIG. 2, transfer the encrypted data segment (e.g., encrypted data segment 508 in FIG. 5) to third-party storage system 208.

Storage module 110 may perform step 412 in any suitable manner. For example, storage module 110 may transfer the encrypted data segment to the third-party storage system directly after the data segment is encrypted. Additionally or alternatively, storage module 110 may cache the encrypted data segment for later transfer with a group of encrypted data segments. In some examples, storage module 110 may delete the encrypted data segment upon transferring the same to the third-party storage system (i.e., storage module 110 may delete the encrypted data segment once a copy of the encrypted data segment is stored on the third-party storage system). In other examples, storage module 110 may retain a copy of the encrypted data segment (e.g., for local backup purposes). Upon completion of step 412, exemplary method 400 in FIG. 4 may terminate.

In addition to encrypting and transferring data segments to third-party storage systems, the systems and methods described herein may enable customers to access data segments from third-party storage systems in order to, for example, restore data segments from a backup. For example, after encrypting a data segment, one or more of the various systems described herein may: 1) identify a hash of the encrypted data segment and then 2) save a hash-string pair that includes the hash of the encrypted data segment and the encrypted string.

Figure 6:
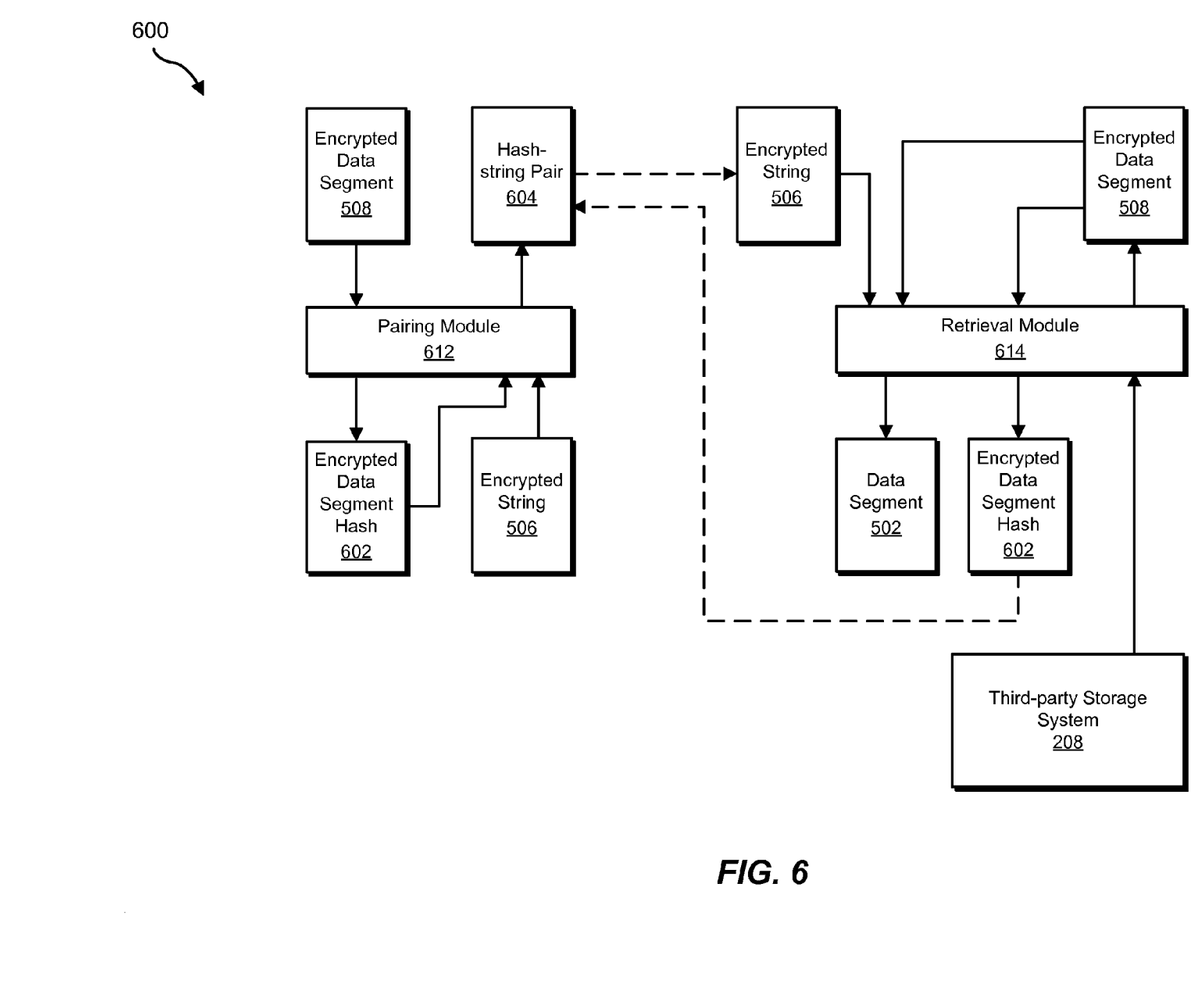
FIG. 6 is a block diagram of an exemplary system for securely deduplicating data owned by multiple entities.

For example, a pairing module 612 within exemplary system 600 in FIG. 6 may identify an encrypted data segment hash 602 associated with an encrypted data segment 508 (by, e.g., performing a hash function on encrypted data segment 508 to generate encrypted data segment hash 602). Pairing module 612 may then pair encrypted data segment hash 602 with encrypted string 506.

Pairing module 612 may save the hash-string pair in any suitable manner. In one example, pairing module 612 may save the hash-string pair in a database. Additionally or alternatively, pairing module 612 may use an associative array for storing the hash-string pair, using the hash of the encrypted data segment as a key and the encrypted string as the corresponding value. Pairing module 612 may use a variety of data structures to implement the associative array, such as a hash table, a self-balancing binary search tree, a B-tree, etc.

FIG. 6 also shows a retrieval module 614. In one example, retrieval module 614 may access data segments from the third-party storage system. For example, retrieval module 614 may: 1) retrieve the encrypted data segment from the third-party storage system, 2) identify the hash of the encrypted data segment, 3) locate the hash-string pair using the hash of the encrypted data segment, 4) identify the encrypted string in the hash-string pair, and then 5) decrypt the encrypted data segment using the encrypted string.

Retrieval module 614 may use the hash-string pair to identify the encrypted string in any suitable manner. As described above, the hash-string pair may constitute a key-value relationship in an associative array. Accordingly, retrieval module 614 may locate the hash-string pair and identify the encrypted string by using the hash of the encrypted data segment as a key in the associative array.

Using FIG. 6 as an example, retrieval module 614 may retrieve an encrypted data segment 508 from third-party storage system 208. Retrieval module 614 may then identify an encrypted data segment hash 602 of encrypted data segment 508. Retrieval module 614 may then use encrypted data segment hash 602 with hash-string pair 604 (using, e.g., an associative array that recognizes hash-string pair 604) to retrieve encrypted string 506. Retrieval module 614 may then decrypt encrypted data segment 508 using encrypted string 506 to produce data segment 502.

In some embodiments, the systems described herein may also identify a policy restricting cross-client convergent encryption for the data segment. As used herein, the term "cross-client convergent encryption" may refer to any encryption scheme that results in identical encrypted data segments when two or more clients encrypt the same data segments. For example, a data protection policy may require (e.g., for legal or business reasons) that the data segment not use an encryption scheme and key used by others who own an identical copy of the data segment. In such examples, the encrypted string returned by the central server may include an encryption of the hash of the data segment using a client-specific key, either alone or in conjunction with a key generated by the central server. Additionally or alternatively, the hash of the data segment may be encrypted with a client-specific key before transferring the hash of the data segment to the central server. In the above examples, the third-party storage system 208 may deduplicate data segments sent by the same client, but not across clients.

In some examples, the policy may include a variety of limitations, elements, and/or indicators resulting in the restriction of cross-client encryption for the data segment. For example, the policy may include a limitation on the percentage of data segments in the plurality of data segments that may undergo cross-client encryption. As an example, the policy may allow a maximum of 60% of data segments to undergo cross-client convergent encryption. In this example, the systems described herein may accordingly randomly select 40% of the plurality of data segments to mark as requiring some form of in-house encryption (such as a client-specific key).

In another example, the policy may include an indicator that the data segment is too sensitive to undergo cross-client convergent encryption. For example, legal or organizational requirements may prohibit cross-client convergent encryption for a certain file. In this example, the systems described herein may accordingly mark data segments taken from a file as requiring some form of in-house encryption.

As explained above, by using a central server to provide encrypted strings (e.g., encrypted hashes of the data segments that are to be encrypted) for use as keys for encrypting the data segments, the various systems and methods described herein may enable third-party storage vendors to deduplicate data owned by multiple entities without exposing such deduplicated data to information attacks, such as learn-partial-information attacks.

Figure 7:
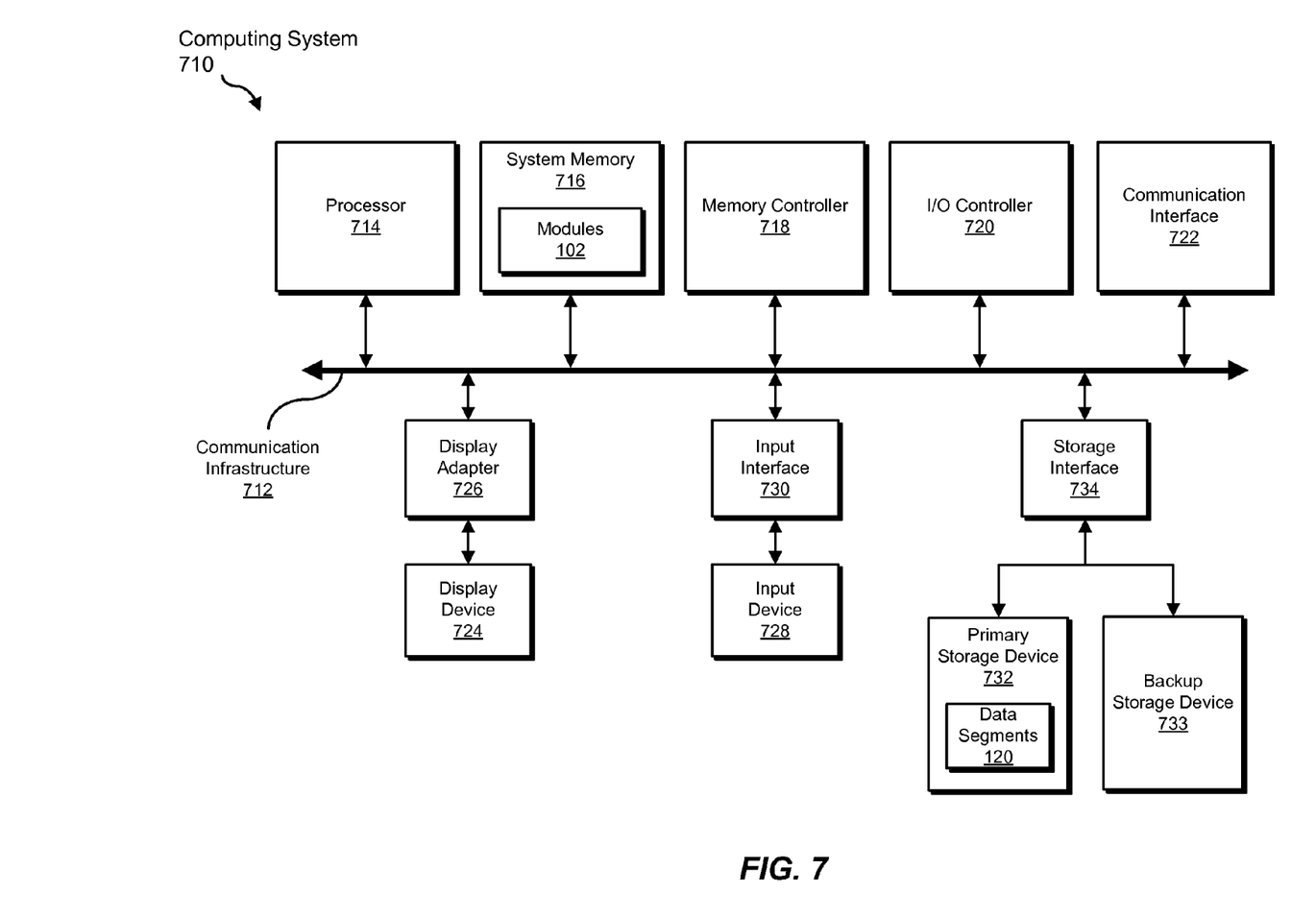
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, transmitting, receiving, encrypting, transferring, saving, accessing, retrieving, locating, and/or decrypting steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an industry standard architecture (ISA), peripheral component interconnect (PCI), peripheral component interconnect express (PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, transmitting, receiving, encrypting, transferring, saving, accessing, retrieving, locating, and/or decrypting.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, transmitting, receiving, encrypting, transferring, saving, accessing, retrieving, locating, and/or decrypting steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, small computer system interface (SCSI) host adapters, universal serial bus (USB) host adapters, Institute of Electrical and Electronics Engineers (IEEE) 1394 host adapters, advanced technology attachment (ATA) and parallel ATA (PATA) host adapters, serial ATA (SATA) and external SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, transmitting, receiving, encrypting, transferring, saving, accessing, retrieving, locating, and/or decrypting steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, transmitting, receiving, encrypting, transferring, saving, accessing, retrieving, locating, and/or decrypting steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data segments 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, transmitting, receiving, encrypting, transferring, saving, accessing, retrieving, locating, and/or decrypting steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
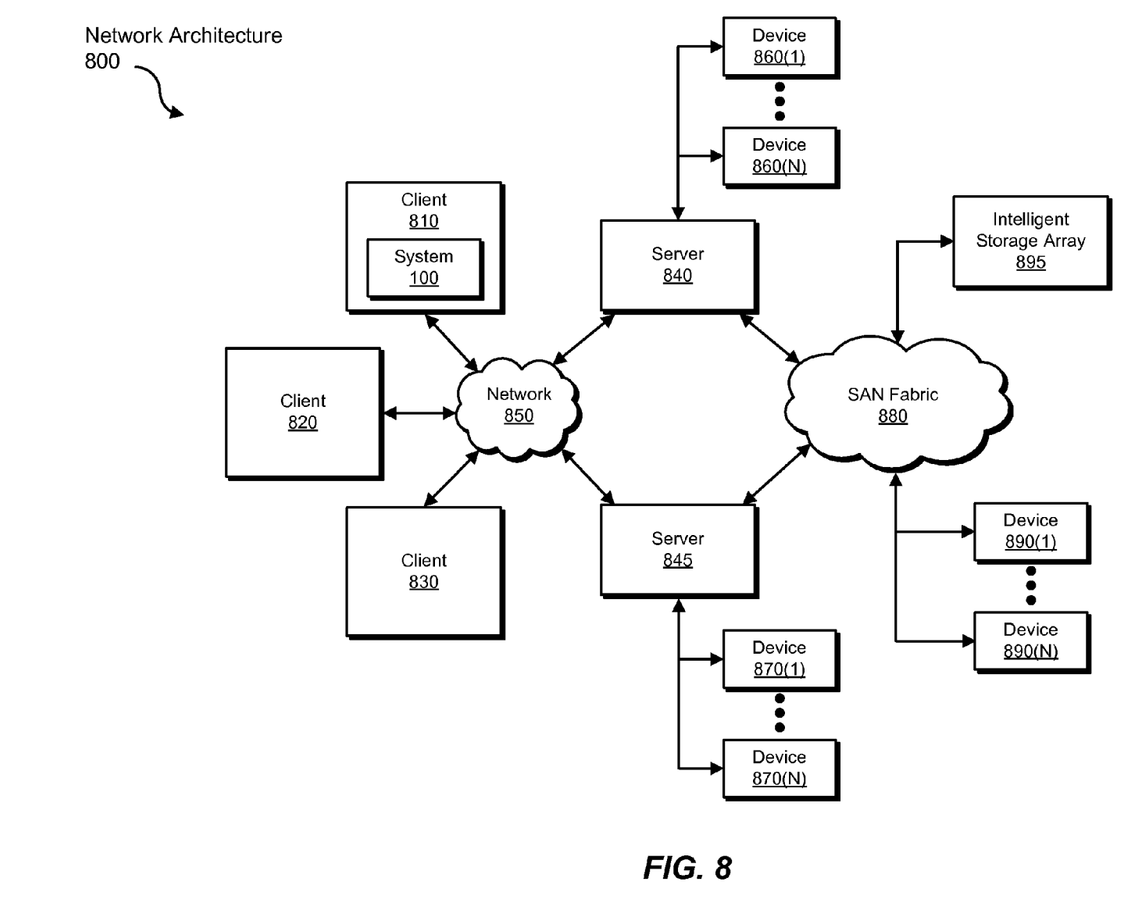
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as network file system (NFS), server message block (SMB), or common internet file system (CIFS).

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, transmitting, receiving, encrypting, transferring, saving, accessing, retrieving, locating, and/or decrypting steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for securely deduplicating data owned by multiple entities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for securely deduplicating data owned by multiple entities. As an additional example, one or more of the modules described herein may transform a data segment into an encrypted data segment that may be securely deduplicated with data owned by other entities.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely deduplicating data owned by multiple entities, at least a portion of the method being performed by a client device comprising at least one processor, the method comprising:
    identifying, at the client device, a plurality of data segments to store on a third-party storage system;
    for each data segment, performing the following steps at the client device:
    identifying a hash of the data segment;
    transmitting the hash of the data segment to a central server;
    receiving an encrypted string that is based on the hash of the data segment from the central server, wherein the encrypted string comprises an encryption of the hash of the data segment using a key that is derived from the hash of the data segment using a transformation function;
    encrypting the data segment with the encrypted string;
    transferring the encrypted data segment to the third-party storage system.

2. The computer-implemented method of claim 1, wherein encrypting the data segment with the encrypted string comprises encrypting the data segment using the encrypted string as a symmetric key.

3. The computer-implemented method of claim 1, further comprising:
    identifying a hash of the encrypted data segment;
    saving a hash-string pair that comprises the hash of the encrypted data segment and the encrypted string.

4. The computer-implemented method of claim 3, further comprising accessing the data segment from the third-party storage system.

5. The computer-implemented method of claim 4, wherein accessing the data segment from the third-party storage system comprises performing the following steps at the client device:
    retrieving the encrypted data segment from the third-party storage system;
    identifying the hash of the encrypted data segment;
    locating the hash-string pair using the hash of the encrypted data segment;
    identifying the encrypted string in the pair;
    decrypting the encrypted data segment with the encrypted string.

6. The computer-implemented method of claim 1, wherein the transformation function comprises at least one of a hash function and a mapping function.

7. The computer-implemented method of claim 1, further comprising identifying a policy restricting cross-client convergent encryption for the data segment.

8. The computer-implemented method of claim 7, wherein the key that is based on the hash of the data segment comprises a client-specific key.

9. The computer-implemented method of claim 7, wherein the policy comprises a limitation of the percentage of data segments in the plurality of data segments that may undergo cross-client convergent encryption.

10. The computer-implemented method of claim 7, wherein the policy comprises an indicator that the data segment is too sensitive to undergo cross-client convergent encryption.

11. A system for securely deduplicating data owned by multiple entities, the system comprising:
    an identification module programmed to identify, at a client device, a plurality of data segments to store on a third-party storage system;
    a hash-to-key module programmed to perform the following steps at the client device for each data segment:
    identify a hash of the data segment;
    transmit the hash of the data segment to a central server;
    receive an encrypted string that is based on the hash of the data segment from the central server, wherein the encrypted string comprises an encryption of the hash of the data segment using a key that is derived from the hash of the data segment using a transformation function;
    an encryption module programmed to encrypt the data segment with the encrypted string;
    a storage module programmed to transfer the encrypted data segment to the third-party storage system;
    at least one processor configured to execute the identification module, the hash-to-key module, the encryption module, and the storage module.

12. The system of claim 11, wherein the encryption module is programmed to encrypt the data segment with the encrypted string by encrypting the data segment using the encrypted string as a symmetric key.

13. The system of claim 11, further comprising a pairing module programmed to:
    identify a hash of the encrypted data segment;
    save a hash-string pair that comprises the hash of the encrypted data segment and the encrypted string.

14. The system of claim 13, further comprising a retrieval module programmed to access the data segment from the third-party storage system.

15. The system of claim 14, wherein the retrieval module is programmed to access the data segment from the third-party storage system by performing the following steps at the client device:
    retrieving the encrypted data segment from the third-party storage system;
    identifying the hash of the encrypted data segment;
    locating the hash-string pair using the hash of the encrypted data segment;
    identifying the encrypted string in the pair;
    decrypting the encrypted data segment with the encrypted string.

16. The system of claim 11, wherein the third-party storage system comprises a single-instance storage system.

17. The system of claim 11, wherein the hash-to-key module is further programmed to identify a policy restricting cross-client convergent encryption for the data segment.

18. A non-transitory computer-readable-storage medium comprising one or more computer-executable instructions that, when executed by at least one processor of a computing client device, cause the computing client device to:
    identify, at the client device, a plurality of data segments to store on a third-party storage system;
    for each data segment, perform the following steps at the client device:
    identify a hash of the data segment;
    transmit the hash of the data segment to a central server;
    receive an encrypted string that is based on the hash of the data segment from the central server, wherein the encrypted string comprises an encryption of the hash of the data segment using a key that is derived from the hash of the data segment using a transformation function;
    encrypt the data segment with the encrypted string;
    transfer the encrypted data segment to the third-party storage system.

* * * * *

UNITED STATES PATENT AND TRADEMARK OFFICE
CERTIFICATE OF CORRECTION

| | | |
|---|---|---|
| PATENT NO. | : 8,401,185 B1 | Page 1 of 1 |
| APPLICATION NO. | : 12/697705 | |
| DATED | : March 19, 2013 | |
| INVENTOR(S) | : Nilesh Telang | |

It is certified that error appears in the above-identified patent and that said Letters Patent is hereby corrected as shown below:

In the Claims:

Claim 18, at column 16, lines 44 to 47, should read:

A non-transitory computer-readable-storage medium comprising one or more computer-executable instructions that, when executed by at least one processor of a client device, cause the client device to:

Signed and Sealed this
Thirtieth Day of July, 2013

Teresa Stanek Rea
*Acting Director of the United States Patent and Trademark Office*